United States Patent
Aoki

(10) Patent No.: US 7,378,464 B2
(45) Date of Patent: May 27, 2008

(54) TIRES FOR HEAVY LOAD

(75) Inventor: Hirofumi Aoki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 317 days.

(21) Appl. No.: 10/532,604

(22) PCT Filed: Oct. 21, 2003

(86) PCT No.: PCT/JP03/13441

§ 371 (c)(1),
(2), (4) Date: Apr. 25, 2005

(87) PCT Pub. No.: WO2004/037915

PCT Pub. Date: May 6, 2004

(65) Prior Publication Data

US 2006/0052506 A1    Mar. 9, 2006

(30) Foreign Application Priority Data

Oct. 23, 2002    (JP)    ............................. 2002-307903

(51) Int. Cl.
*B60C 1/00*    (2006.01)
(52) U.S. Cl. ...................... 524/189; 524/505; 524/525; 524/526
(58) Field of Classification Search ................. 524/189, 524/505, 525, 526
See application file for complete search history.

(56) References Cited

U.S. PATENT DOCUMENTS

2002/0049294 A1*  4/2002  Shiina ..................... 526/329.2

FOREIGN PATENT DOCUMENTS

JP    2002-146101 A    5/2002
JP    2002-146102 A    5/2002

* cited by examiner

*Primary Examiner*—Peter D Mulcahy
(74) *Attorney, Agent, or Firm*—Sughrue Mion, PLLC

(57) ABSTRACT

There is provided a heavy duty tire made by using as a tread rubber a rubber composition obtained by compounding 100 parts by mass of a rubber component consisting of 90-30% by mass of (a) natural rubber and 10-70% by mass of (b) a solution-polymerized styrene-butadiene copolymer rubber containing tin in at least one of a middle of a polymer molecular chain and a terminal of the molecular chain and having a bound styrene content of 28-45% by mass and a vinyl bond content in a butadiene portion of less than 30 mol % with 40-60 parts by mass in total of (c) carbon black and (d) silica, provided that an amount of (d) silica as a filler is 5-20 parts by mass. In the heavy duty tire, the resistance to uneven wear is considerably improved without damaging the heat buildup and wear resistance.

3 Claims, No Drawings

TIRES FOR HEAVY LOAD

TECHNICAL FIELD

This invention relates to a heavy duty tire and more particularly to a heavy duty tire considerably improving a resistance to uneven wear.

BACKGROUND ART

For the purpose of controlling the uneven wear of the tire, there have hitherto been made various means in the design of tread groove, tread crown form, tread pattern or the like such as defense grooves, side grooves and the like. However, these means have a problem that the control of the uneven wear is insufficient. In general, non-uniform wear is caused in ribs, blocks and the like of the tire tread by various factors before the occurrence of the uneven wear in the tire.

Since such a non-uniform wear is caused by an input in a radial direction, an input in a circumferential direction or an input of a composite thereof with respect to a rotating direction of the tire, it is attempted to improve the resistance to uneven wear by using a rubber composition hardly affected by these inputs in a tread and combining with a tire structure.

In order to prevent the uneven wear in the tire, there is used a method of using a rubber composition compounded with styrene-butadiene copolymer rubber in the tread to enhance hysteresis loss. However, the compounding of the styrene-butadiene copolymer rubber deteriorates the heat buildup of the tire, so that there is particularly a restriction in the compounding amount thereof in heavy duty tires.

Now, there is proposed an attempt that a solution-polymerized styrene-butadiene rubber modified at a terminal of its polymer molecule is used to enhance dispersion of carbon black through a coupling effect of its modified terminal, whereby the self-heat generation is improved to make the heat buildup low to establish the resistance to uneven wear and the heat buildup (e.g. see JP-A-11-217004, page 3). However, it can not be said to be sufficient in the heavy duty tire.

Further, there is proposed a technique of establishing the resistance to uneven wear and the heat buildup by a combination of solution-polymerized styrene-butadiene copolymer rubber, silica and a silane coupling agent (e.g. see JP-A-11-59116, page 1).

However, silica has such an effect that the heat buildup is not lowered while enhancing the hysteresis loss, but has a fear of lowering the wear resistance under severe use condition in the heavy duty tire. In such a compounding technique, the resistance to uneven wear and the heat buildup are conflicting relation and it is difficult to establish them simultaneously.

DISCLOSURE OF THE INVENTION

Under the above situation, the invention is made for solving the above problems and is to provide a heavy duty tire considerably improving the resistance to uneven wear without damaging the heat buildup and wear resistance of the tire.

The inventor has found that proper amounts of a solution-polymerized styrene-butadiene copolymer rubber having a high-cis content, silica and a specified hydrazone compound are compounded in a rubber composition for a tire tread, whereby the hysteresis loss can be improved while controlling the self-heat buildup of the rubber and the resistance to uneven wear can be improved without deteriorating the heat buildup and the wear resistance, and as a result, the invention has been accomplished.

That is, the invention provides a heavy duty tire characterized by using as a tread rubber a rubber composition obtained by compounding 100 parts by mass of a rubber component consisting of 90-30% by mass of (a) natural rubber and 10-70% by mass of (b) a solution-polymerized styrene-butadiene copolymer rubber containing tin in at least one of a middle of a polymer molecular chain and a terminal of the molecular chain and having a bound styrene content of 28-45% by mass and a vinyl bond content in a butadiene portion of less than 30 mol % with 40-60 parts by mass in total of (c) carbon black and (d) silica, provided that an amount of (d) silica as a filler is 5-20 parts by mass.

Further, the invention provides a heavy duty tire in which 0.3-3.0 parts by mass of (e) a hydrazone compound is further compounded per 100 parts by mass of the rubber component.

BEST MODE FOR CARRYING OUT THE INVENTION

As the component (a) of the rubber composition used in the tire according to the invention is used natural rubber, but a part of natural rubber may be replaced with polyisoprene rubber having the same structure as the natural rubber.

The amount of (a) natural rubber is 90-30% by mass based on 100 parts by mass of the rubber component, preferably 60-40% by mass. When the amount of the component (a) exceeds 90% by mass, there is no effect on the resistance to uneven wear, while when it is less than 30% by mass, it is difficult to maintain the low heat buildup.

In the rubber composition used in the tire according to the invention, as the component (b) is used a solution-polymerized styrene-butadiene copolymer rubber containing tin in at least one of a middle of a polymer molecular chain and a terminal of the molecular chain and having a bound styrene content of 28-45% by mass and a vinyl bond content in a butadiene portion of less than 30 mol %.

The amount of (b) solution-polymerized styrene-butadiene copolymer rubber is 10-70% by mass based on 100 parts by mass of the rubber component, preferably 40-60% by mass. When the amount of the component (b) is less than 10% by mass, the improving effect on the uneven wear is poor, while when it exceeds 70% by mass, the fracture properties are considerably deteriorated.

Also, the bound styrene content in the component (b) of the rubber composition used in the tire according to the invention is 28-45% by mass. When the content is less than 28% by mass, the effect of establishing the resistance to uneven wear and the low heat buildup is poor, while when it exceeds 45% by mass, the wear resistance is deteriorated.

Further, the vinyl bond content in the component (b) is less than 30 mol %. When the content is not less than 30 mol %, the wear resistance lowers.

In the component (b), a molecular structure of a reaction portion, which is formed by reacting a terminal carbanion of hydrocarbon group-bonded styrene-butadiene copolymer obtained through an organolithium initiator consisting of a hydrocarbon group and lithium with a coupling agent or a modifying agent, has a tin-carbon bond.

For example, the molecular structure of the reaction portion, which is formed by a stoichiometric reaction between a one-side terminal carbanion of a butyl group terminal bonded styrene-butadiene copolymer obtained through a butyllithium initiator consisting of butyl group as a hydrocarbon group and lithium and tin tetrachloride as a coupling agent, has a structure that four butyl terminal styrene-butadiene copolymers are bonded to tin, i.e. a structure that tin-carbon bond is existent in a middle portion of the final polymer.

When tributyltin chloride is used as a modifying agent instead of tin tetrachloride in the above embodiment, there is obtained a final polymer having a structure of tin-carbon bond at the other terminal of the butyl group terminal styrene-butadiene copolymer.

The above structure has an interaction with a filler such as carbon black or the like and is essential for improving the low hysteresis property and the wear resistance.

Furthermore, a weight average molecular weight before the modification reaction of the component (b) is preferably $5 \times 10^4$-$100 \times 10^4$, more preferably $10 \times 10^4$-$100 \times 10^4$ for providing excellent properties, and also a molecular weight distribution before the modification reaction is preferably 1.0-1.3.

Moreover, the production method of the component (b) is not particularly limited as far as the molecular structure defined in the invention is obtained, but the copolymer of the component (b) is easily obtained by the following method (a detail of which is disclosed in, for example, JP-A-9-316132). The styrene-butadiene copolymer of the component (b) is obtained by copolymerizing styrene and butadiene in a hydrocarbon solvent in the presence of (1) an organolithium initiator consisting of a hydrocarbon group and lithium, (2) at least one potassium compound selected from the group consisting of potassium alcoholate, potassium sulfonate and potassium carboxylate, and (3) at least one compound selected from the group consisting of ether compounds and amine compounds, and adding a tin compound as a modifying agent after the copolymerization.

As the hydrocarbon solvent can be used an aromatic hydrocarbon solvent such as benzene, toluene, xylene or the like; an aliphatic hydrocarbon solvent such as n-pentane, n-hexane, n-butane or the like; an alicyclic hydrocarbon solvent such as methylcyclopentane, cyclohexane or the like; and a mixture thereof, which are not particularly limited.

As the organolithium initiator, mention may be made of alkyllithiums such as methyllithium, ethyllithium, propyllithium, n-butyllithium, sec-butyllithium, t-butyllithium, hexyllithium, octyllithium and the like; aryllithiums such as phenyllithium, tolyllithium and the like; and aralkyllithiums such as benzyllithium and the like.

Among them, n-butyllithium and sec-butyllithium are preferable from a viewpoint of industrial production. These organolithium initiators may be used alone or in a combination of two or more.

The amount of such a polymerization initiator added is determined in accordance with the desired molecular weight of the copolymer, but is usually 0.05-15 mmol, preferably 0.1-10 mmol per 100 g of the monomer. When the amount exceeds 15 mmol, it is difficult to obtain a higher molecular weight polymer, while when it is less than 0.05 mmol, the polymerization may not proceed.

As a randomizer are used a potassium compound, an ether compound and an amine compound. The term "randomizer" used herein means a compound having an action of increasing the vinyl bond content in the butadiene portion of the styrene-butadiene copolymer (this action is small in the potassium compound), a randomization of composition distribution of butadiene unit and styrene unit, and the like.

The potassium compound used herein are potassium alcoholate, potassium sulfonate and/or potassium carboxylate. As the potassium alcoholate may be mentioned, for example, potassium t-butylate, potassium t-amylate, potassium ethylate, potassium isopropylate, potassium octylate, potassium dodecylate, potassium nonylphenylate and the like. Among them, potassium t-amylate and potassium nonylphenylate are preferable in view of the effect.

As the potassium sulfonate may be mentioned, for example, potassium dodecylbenzene sulfonate, potassium naphthalene sulfonate and the like. Among them, potassium dodecylbenzene sulfonate is preferable in view of the effect.

As the potassium carboxylate may be mentioned, for example, potassium stearate, potassium decanoate, potassium dodecanoate, potassium octoate, potassium naphthate and the like. Among them, potassium naphthate is preferable in view of the effect.

The amount of the potassium compound added is 0.01-0.2 mol equivalent per 1 mol of lithium, preferably 0.03-0.09 mol equivalent in view of the effect. When the amount is less than 0.01 mol equivalent, there is no effect as the randomizer, while when it exceeds 0.2 mol equivalent, undesirable side reaction such as metalation or the like occurs.

Also, the ether compound and/or the amine compound are used together with the potassium compound. As the ether compound and/or the amine compound, there can be used compounds usually used as a randomizer in the copolymerization of styrene and butadiene, which are not particularly limited. Among them, a dialkoxyalkyl compound such as diethoxy ethane or the like; a diethylene glycol dialkyl ether compound such as diethylene glycol dimethyl ether, diethylene glycol diethyl ether or the like; an ethylene glycol dialkyl ether compound such as ethylene glycol dimethyl ether, ethylene glycol diethyl ether or the like; a tetrahydrofuran oligomer compound such as diterahydrofuryl propane or the like; tetrahydrofuran; a diamine compound such as tetramethylethylene diamine or the like; and a triamine compound such as pentamethylene diethylene triamine or the like are preferably used.

The amount of the ether compound and/or the amine compound added is preferable to be an amount that the vinyl bond content in the butadiene portion is not more than 30 mol %. This amount is hardly identified because it is dependent upon the kind of the ether compound or the amine compound, but is usually 0.01-2.0 mol equivalent per 1 mol of lithium. For example, a proper amount when using tetrahydrofuran is 0.5-2.0 mol equivalent, and a proper amount when using diethylene glycol dimethyl ether is 0.03-0.1 mol equivalent.

Also, the coupling agent or modifying agent is a tin compound. As the tin compound are mentioned, for example, a tin halide such as tin tetrachloride or the like; and an organic tin chloride compound such as butyltin trichloride, dibutyltin dichloride, dioctyltin dichloride, diphenyltin dichloride, tributyltin chloride, triphenyltin chloride or the like. It can be used in such an amount that an active terminal lithium of the styrene-butadiene copolymer is equivalent to a halogen atom of the above compound.

Among these compounds, tin tetrachloride, the organic tin dichloride or the like contributes to a low hysteresis loss because it is subjected to a coupling reaction with the active terminal of the styrene-butadiene copolymer to provide a coupled copolymer and the coupling efficiency is not less than 60%. Also, the organic tin monochloride compound improves the low hysteresis loss because it is reacted with the active terminal lithium to provide a terminal-modified copolymer.

In the rubber composition used in the tire according to the invention, carbon black (c) and silica (d) are used as a filler.

By compounding carbon black can be obtained an effect of improving the wear resistance leading to the improvement of the fracture resistance. The compounding amount in total of carbon black (c) and silica (d) is 40-60 parts by mass based on 100 parts by mass of the rubber component. When it is less than 40 parts by mass, the wear resistance is deteriorated, while when it exceeds 60 parts by mass, the low heat buildup is deteriorated.

The kind of carbon black (c) is not particularly limited, but can be used by arbitrarily selecting from those usually used as a filler for the reinforcement of the conventional rubber. As the carbon black (c) are mentioned, for example, FEF, SRF, HAF, ISAF, SAF and the like. Among them, carbon black SAF is preferable.

Furthermore, the compounding amount of silica as the component (d) 5-20 parts by mass based on 100 parts by mass of the rubber component. When the amount is less than 5 parts by mass, the effect of improving the resistance to uneven wear is poor, while when it exceeds 20 parts by mass, the wear resistance and the fracture properties are largely deteriorated. From the same viewpoint, it is preferably 7-15 parts by mass. Also, silica is not particularly limited, but can be used by properly selecting from those usually used as a filler for the reinforcement of the conventional rubber.

For example, there are mentioned wet silica (hydrated silica), dry silica (anhydrated silica), calcium silicate, aluminum silicate and the like. Among them, wet silica is preferable.

Further, silica of the component (d) is preferable to have a nitrogen adsorption specific surface area ($N_2SA$) of 120-240 $m^2/g$. When $N_2SA$ is less than 120 $m^2/g$, the wear resistance becomes insufficient, while when $N_2SA$ exceeds 240 $m^2/g$, the poor dispersion is caused, which results in the considerable lowering of the low heat buildup, wear resistance and factory operability.

Moreover, the above $N_2SA$ is a value measured according to ASTM D4820-93 after the drying at 300° C. for 1 hour.

In the rubber composition used in the tire according to the invention, a hydorazone compound (e) is compounded in an amount of 0.3-3.0 parts by mass based on 100 parts by mass of the rubber component.

When the amount of the component (e) is not less than 0.3 part by mass, the effect of improving the resistance to uneven wear and the heat buildup is obtained, while when it is not more than 3.0 parts by mass, there is no problem in the factory operability.

As the hydorazone compound used as the component (e) in the rubber composition used in the tire according to the invention, naphthoic acid hydrazide and salicylic acid hydrazide represented, for example, by the following general formulae (I), (II) are preferable in view of performances.

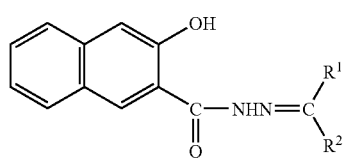

(I)

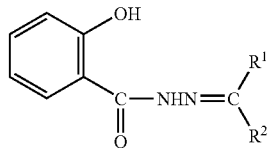

(II)

(wherein $R^1$ and $R^2$ are a hydrogen atom or a hydrocarbyl group having a carbon number of 1-18, respectively and may be the same or different, or $R^1$ and $R^2$ may be bonded to each other to form a ring structure. As the hydrocarbyl group having a carbon number of 1-18 may be mentioned a straight or branched alkyl group having a carbon number of 1-18, a straight or branched alkenyl group having a carbon number of 2-18, a cycloalkyl group having a carbon number of 3-8, an aryl group having a carbon number of 6-18 and an aralkyl group having a carbon number of 7-18. On a ring of the cycloalkyl group, the aryl group or the aralkyl group may be provided a proper substituent such as a lower alkyl group, a lower alkoxyl group, an amino group, an alkyl-substituted amino group, a hydroxyl group or the like.)

As the hydrazide compounds of the general formulae (I) and (II), there are concretely 2-hydroxy-N'-(1-methylethylidene)-3-naphthoic acid hydrazide, 2-hydroxy-N'-(1-methylpropylidene)-3-naphthoic acid hydrazide, 2-hydroxy-N'-(1-methylbutylidene)-3-naphthoic acid hydrazide, 2-hydroxy-N'-(1,3-dimethylbutylidene)-3-naphthoic acid hydrazide, 2-hydroxy-N'-(2,6-dimethyl-4-heptylidene)-3-naphthoic acid hydrazide, N'-(1-methylethylidene)-salicylic acid hydrazide, N'-(1-methylpropylidene)-salicylic acid hydrazide, N'-(1-methylbutylidene)-salicylic acid hydrazide, N'-(1,3-dimethylbutylidene)-salicylic acid hydrazide, and N'-(2,6-dimethyl-4-heptylidene)-salicylic acid hydrazide.

Among them, 2-hydroxy-N'-(1,3-dimethylbutylidene)-3-naphthoic acid hydrazide (BMH) is particularly preferable.

The hydrazone compound of the component (e) has an action of suppressing the lowering of elastic modulus resulted from the over vulcanization due to reversion of natural rubber (a) to control the lowering of the low heat buildup and the wear resistance.

By compounding the hydrazone compound (e) is raised the modulus of elasticity at a low strain region to suppress the deformation of the tread rubber, whereby the lowering of the hysteresis loss prevented while lowering the modulus of elasticity at a high strain region by the action of silica to ensure the elongation of the tread rubber and hence the resistance to uneven wear and the low heat buildup can be established simultaneously.

Also, the rubber composition used in the tire according to the invention may be properly compounded with the other additives such as sulfur, vulcanization accelerator, process oil, antioxidant and the like, if necessary.

The rubber composition used in the tire according to the invention is obtained by milling with a milling machine such as rolls, internal mixer or the like, and is suitably used as a rubber composition for a tread of a heavy duty tire highly balancing the resistance to uneven wear, wear resistance and low heat buildup.

The tire according to the invention is produced by a usual method using the above rubber composition.

That is, the rubber composition formed by compounding the above various additives, if necessary, is extrusionmolded into various members for tire at an unvulcanized state, which are attached on a tire building machine in the usual manner to form a green tire. The green tire is heated and pressurized in a vulcanization machine to obtain a tire.

Moreover, as a gas filled in the tire can be used normal air or air having a changed oxygen partial pressure, and an inert gas such as nitrogen or the like.

The following examples are given in illustration of the invention and are not intended as limitations thereof.

EXAMPLES

Various measurements are carried out by the following methods.

Evaluations of green rubber and vulcanized rubber Vinyl bond content in butadiene portion (mol %): is measured by an infrared spectrophotometry (Morero's method).

Bound styrene content: is measured from an absorption intensity of aromatic proton in a nuclear magnetic resonance (NMR) spectrum.

Evaluation of Test Tire

Evaluation of heat buildup: A drum test is carried out under conditions of constant speed and step load to measure a temperature at a position of a constant depth inside the tire, which is represented by an index on the basis that a value of control (Comparative Example 1) is 100. The larger the index value, the larger the effect of lowering heat buildup.

Evaluation of wear resistance: A wear resistance of a tread rubber in the tire after the running over 100000 km is calculated by an equation of [running distance/(groove depth before running−groove depth after running)] and represented by an index on the basis that a value of Comparative Example 1 is 100. The larger the index value, the better the wear resistance.

Evaluation of resistance to uneven wear: The tire is mounted on a front wheel of a truck and run over 100000 km, and thereafter uneven worn area is measured and a reciprocal number of the measured value is represented by an index on the basis that a value of Comparative Example 1 is 100. The larger the index value, the better the resistance to uneven wear.

Production Example 1

Polymer A

Into a glass pressure container of 800 ml dried and purged with nitrogen are charged 300 g of cyclohexane, 32.5 g of 1,3-butadiene monomer, 17.5 g of styrene monomer, 0.025 mmol of potassium t-amylate and 1 mmol of THF, and 0.45 mmol of n-butyllithium (BuLi) is added to conduct polymerization at 50° C. for 3 hours. The polymerization system is uniform and transparent without precipitation from a start of polymerization to an end thereof. The polymerization conversion is approximately 100%.

To this polymerization system is added 0.12 mmol of 1M cyclohexane solution of DOTDC (dioctyltin dichloride) as a modifying agent to conduct modification reaction for 30 minutes. To the polymerization system is further added 0.5 ml of 5% isopropanol solution of 2,6-di-tertiary butyl paracresol (BHT) to stop the reaction, which is further dried to obtain a polymer A. The bound styrene content is 35% by mass and the vinyl bond content is 23 mol %.

Production Example 2

Polymer B

Into a glass pressure container of 800 ml dried and purged with nitrogen are charged 300 g of cyclohexane, 37.5 g of 1,3-butadiene monomer, 12.5 g of styrene monomer, 0.03 mmol of potassium t-amylate and 2 mmol of THF, and further added with 0.41 mmol of hexamethylene imine as a secondary amine. It is further added with 0.45 mmol of n-butyllithium (BuLi) to conduct polymerization at 50° C. for 2.5 hours. The polymerization system is uniform and transparent without precipitation from a start of polymerization to an end thereof. The polymerization conversion is approximately 100%.

To this polymerization system is added 0.09 mmol of 1M cyclohexane solution of TTC (tin tetrachloride) as a modifying agent to conduct modification reaction for 30 minutes. To the polymerization system is further added 0.5 ml of 5% isopropanol solution of 2,6-di-tertiary butyl paracresol (BHT) to stop the reaction, which is further dried to obtain a polymer B. The bound styrene content is 25% by mass and the vinyl bond content is 28 mol %.

Production Example 3

Polymer C

Into a glass pressure container of 800 ml dried and purged with nitrogen are charged 300 g of cyclohexane, 32.5 g of 1,3-butadiene monomer, 17.5 g of styrene monomer, 0.025 mmol of potassium t-amylate and 1 mmol of THF, and 0.45 mmol of n-butyllithium (BuLi) is added and further 0.41 mmol of hexamethylene imine is added as a secondary amine to conduct polymerization at 50° C. for 3 hours. The polymerization system is uniform and transparent without precipitation from a start of polymerization to an end thereof. The polymerization conversion is approximately 100%.

To this polymerization system is added 0.12 mmol of 1M cyclohexane solution of DOTDC (dioctyltin dichloride) as a modifying agent to conduct modification reaction for 30 minutes. To the polymerization system is further added 0.5 ml of 5% isopropanol solution of 2,6-di-tertiary butyl paracresol (BHT) to stop the reaction, which is further dried to obtain a polymer C. The bound styrene content is 35% by mass and the vinyl bond content is 24 mol %.

The evaluation results are shown in Table 1, and characteristic values of the polymers A-C are shown in Table 2.

TABLE 1

|   | Comparative Example 1 | Comparative Example 2 | Comparative Example 3 | Comparative Example 4 | Example 1 | Example 2 | Example 3 | Example 4 | Example 5 | Example 6 |
|---|---|---|---|---|---|---|---|---|---|---|
| Natural rubber | 50 | 50 | 40 | 50 | 50 | 50 | 40 | 50 | 50 | 50 |
| Polymer A *1 | — | — | — | — | 50 | 50 | 60 | — | — | 50 |
| Polymer B *2 | 50 | 50 | 60 | 50 | — | — | — | — | — | — |
| Polymer C *3 | — | — | — | — | — | — | — | 50 | 50 | — |

TABLE 1-continued

|  | Comparative Example 1 | Comparative Example 2 | Comparative Example 3 | Comparative Example 4 | Example 1 | Example 2 | Example 3 | Example 4 | Example 5 | Example 6 |
|---|---|---|---|---|---|---|---|---|---|---|
| Carbon black *4 | 45 | 40 | 45 | 40 | 40 | 40 | 40 | 40 | 40 | 45 |
| Silica *5 | — | 10 | — | 4 | 10 | 10 | 10 | 10 | 15 | 10 |
| Antioxidant 6C *6 | 1 | 1 | 1 | 1 | 1 | 1 | 1 | 1 | 1 | 1 |
| Hydrazone compound *7 | — | — | — | — | — | 1 | 1 | 1 | 1 | 1 |
| Stearic acid | 2 | 2 | 2 | 2 | 2 | 2 | 2 | 2 | 2 | 2 |
| Zinc white | 3 | 3 | 3 | 3 | 3 | 3 | 3 | 3 | 3 | 3 |
| Vulcanization accelerator CZ *8 | 1.2 | 1.2 | 1.2 | 1.2 | 1.2 | 1.2 | 1.2 | 1.2 | 1.2 | 1.2 |
| Sulfur | 1 | 1 | 1 | 1 | 1 | 1 | 1 | 1 | 1 | 1 |
| Bound styrene content | 25 | 25 | 25 | 25 | 35 | 35 | 35 | 35 | 35 | 35 |
| Vinyl bond content | 28 | 28 | 28 | 28 | 23 | 23 | 23 | 24 | 24 | 23 |
| Heat buildup | 100 | 95 | 94 | 104 | 103 | 108 | 102 | 113 | 113 | 100 |
| Resistance to uneven wear | 100 | 109 | 112 | 102 | 120 | 128 | 136 | 128 | 146 | 138 |
| Wear resistance | 100 | 100 | 100 | 95 | 105 | 105 | 100 | 100 | 102 | 106 |

*1. Polymer A: Production Example 1, bound styrene content 35% by mass, vinyl bond content 23 mol%
*2. Polymer B: Production Example 2, bound styrene content 25% by mass, vinyl bond content 28 mol%
*3. Polymer C: Production Example 3, bound styrene content 35% by mass, vinyl bond content 24 mol%
*4. carbon black: Seaste 9, trade mark, made by Tokai Carbon Co., Ltd.
*5. silica: Nipsil AQ, trade mark, made by Nippon Silica Co., Ltd. $N_2SA$ (200 $m^2/g$)
*6. antioxidant 6C: N-phenyl-N'-(1,3-dimethylbutyl)-p-phenylene diamine
*7. hydrazone compound: 2-hydroxy-N'-(1,3-dimethylbutylidene)-3-naphthoic acid hydrazide (BMH)
*8. vulcanization accelerator CZ: N-cyclohexyl-2-benzothiazyl sulfenamide
Note) As to numerical vales in Table 1, the values of natural rubber and polymers A-C are mass%, and the values of carbon black, silica, antioxidant 6C, hydrazone compound, stearic acid, zinc white, vulcanization accelerator CZ and sulfur are parts by mass based on 100 parts by mass of the rubber component.

TABLE 2

|  | Bound styrene content (weight %) | Vinyl bond content (mol %) |
|---|---|---|
| Polymer A | 35 | 23 |
| Polymer B | 25 | 28 |
| Polymer C | 35 | 24 |

Examples 1-6, Comparative Examples 1-4

Each composition having a compounding recipe shown in Table 1 is milled by using a Banbury mixer. The resulting rubber composition is used as a tread rubber to prepare a tire having a tire size of 295/75 R22.5 and then the heat buildup, wear resistance and resistance to uneven wear are evaluated by the aforementioned methods.

As seen from the above results, in the heavy duty tires according to the invention, the resistance to uneven wear is largely improved while maintaining and improving the heat buildup and the wear resistance.

INDUSTRIAL APPLICABILITY

The invention can provide a heavy duty tire considerably improving the resistance to uneven wear without sacrificing the heat buildup and wear resistance.

The invention claimed is:

1. A heavy duty tire characterized by using as a tread rubber a rubber composition obtained by compounding 100 parts by mass of a rubber component consisting of 90-30% by mass of (a) natural rubber and 10-70% by mass of (b) a solution-polymerized styrene-butadiene copolymer rubber containing tin in at least one of a middle of a polymer molecular chain and a terminal of the molecular chain and having a bound styrene content of 28-45% by mass and a vinyl bond content in a butadiene portion of less than 30 mol % with 40-60 parts by mass in total of (c) carbon black and (d) silica, provided that an amount of (d) silica as a filler is 5-20 parts by mass.

2. A heavy duty tire according to claim 1, wherein 0.3-3.0 parts by mass of (e) a hydorazone compound is further compounded per 100 parts by mass of the rubber component.

3. A heavy duty tire according to claim 2, wherein the hydrazone compound (e) is 2-hydroxy-N'-(1,3-dimethylbutylidene)-3-naphthoic acid hydrazide.

* * * * *